United States Patent [19]
Marlek

[11] Patent Number: 4,887,771
[45] Date of Patent: * Dec. 19, 1989

[54] LIQUID CHEMICAL APPLICATOR FOR TREATMENT OF A HORIZONTAL SURFACE

[76] Inventor: Edward Marlek, 8 Northfield Dr., Ft. Salonga, N.Y. 11768

[*] Notice: The portion of the term of this patent subsequent to Jan. 27, 2004 has been disclaimed.

[21] Appl. No.: 135,361

[22] Filed: Dec. 21, 1987

[51] Int. Cl.$^4$ .......................... B05B 15/04; B05B 15/06
[52] U.S. Cl. ................................. 239/722; 239/288.3; 239/600; 403/337
[58] Field of Search ..................... 239/722, 288, 288.3, 239/288.5, 164, 166, 167, 168, 172, 176, 600, 280, 280.5; 403/337, 336; 15/143 B; 16/110 R, 115

[56] References Cited

U.S. PATENT DOCUMENTS

| | | | |
|---|---|---|---|
| 671,626 | 4/1901 | Hobbs | 16/110 R |
| 1,397,747 | 11/1921 | Towner | 180/906 |
| 1,470,283 | 10/1923 | Opitz | 180/906 |
| 1,526,336 | 2/1925 | Hart | 403/337 |
| 2,995,223 | 8/1961 | Roys | 403/336 |
| 3,004,362 | 10/1961 | Day | 16/110 R |
| 3,237,346 | 3/1966 | Watts | 239/722 |
| 3,921,907 | 11/1975 | Anderson | 239/172 |
| 4,084,284 | 4/1978 | Hastings | 15/143 B |
| 4,599,968 | 7/1986 | Ryder et al. | 239/722 |
| 4,638,948 | 1/1987 | Marlek | 239/722 |

Primary Examiner—Andres Kashnikow
Assistant Examiner—Karen B. Merritt
Attorney, Agent, or Firm—Michael I. Kroll

[57] ABSTRACT

An improved liquid chemical applicator for treatment of a horizontal surface is provided and consists of a mechanism that can accomplish a uniform coating of the liquid chemical by keeping a plurality of spray nozzles at a constant height, at a constant pressure and at a proper angle from the surface being treated. The extension handle and axle of the applicator includes connectors so that they can be disassembled and assembled to make the applicator portable, while the length of the axle can be varied by adding and subtracting different segments to the axle.

6 Claims, 2 Drawing Sheets

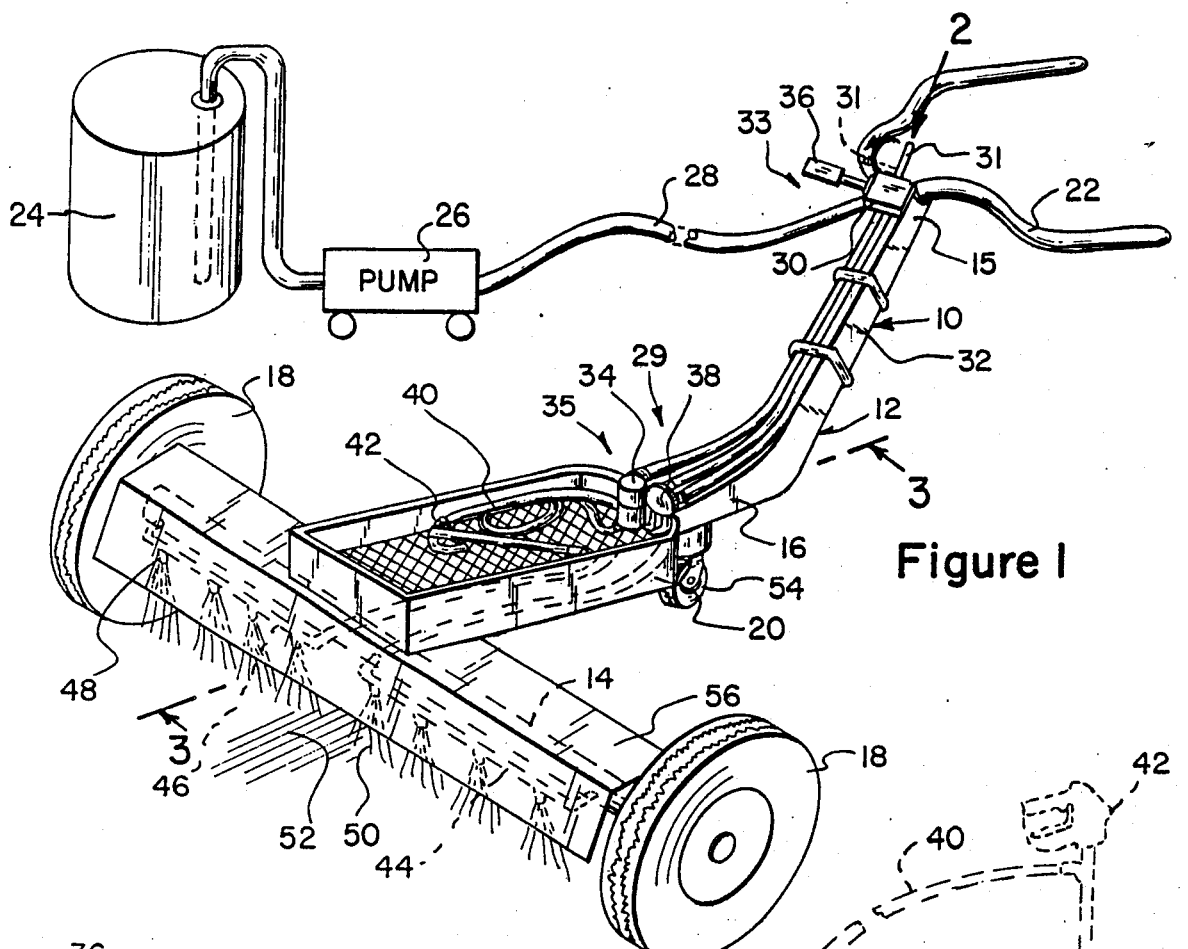
Figure 1
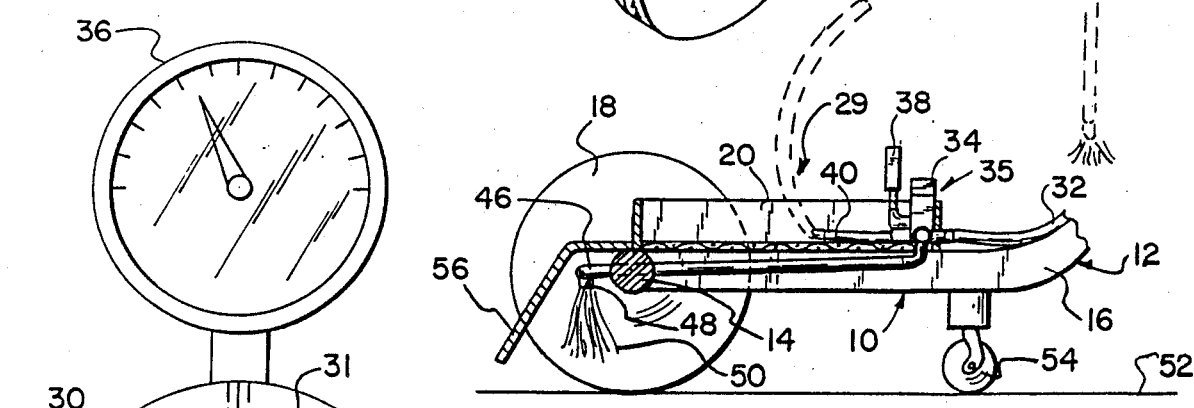
Figure 3
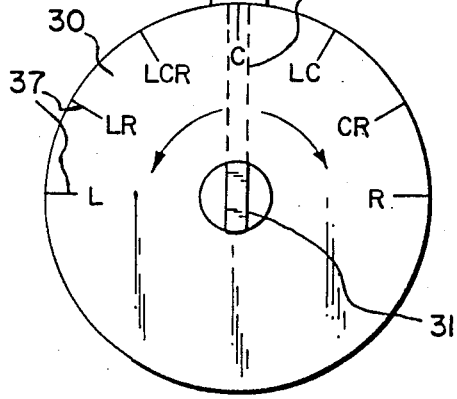
Figure 2
| LEVER POSITION | DESCRIPTION |
|---|---|
| R | RIGHT ONLY |
| CR | CENTER & RIGHT |
| LC | LEFT & CENTER |
| C | CENTER |
| LCR | LFT., CENT. & RHT. |
| LR | LEFT & RIGHT |
| L | LEFT ONLY |
Figure 4

U.S. Patent    Dec. 19, 1989    Sheet 2 of 2    4,887,771
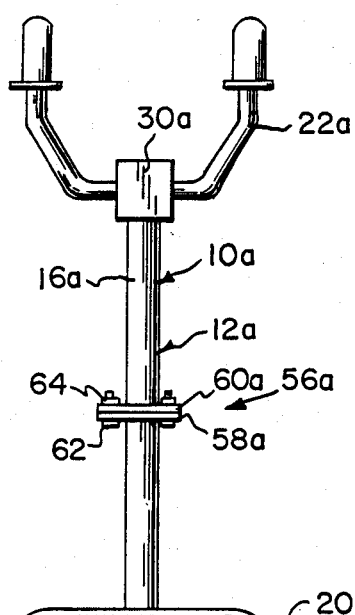
Figure 5
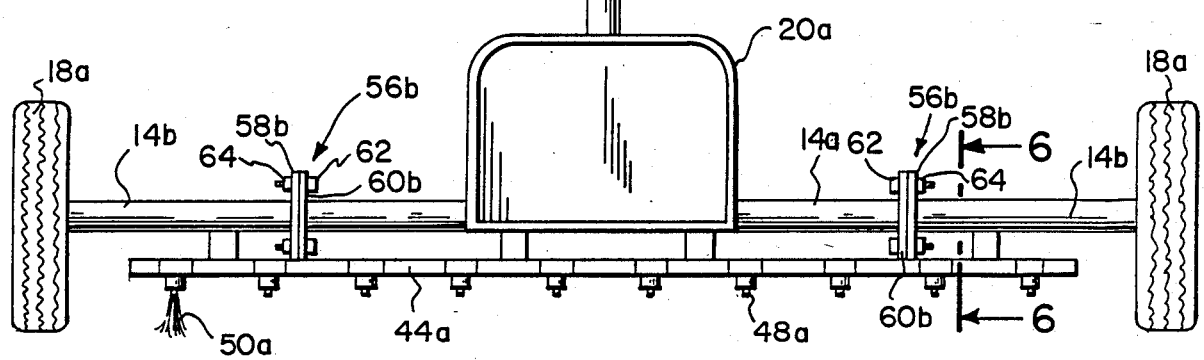
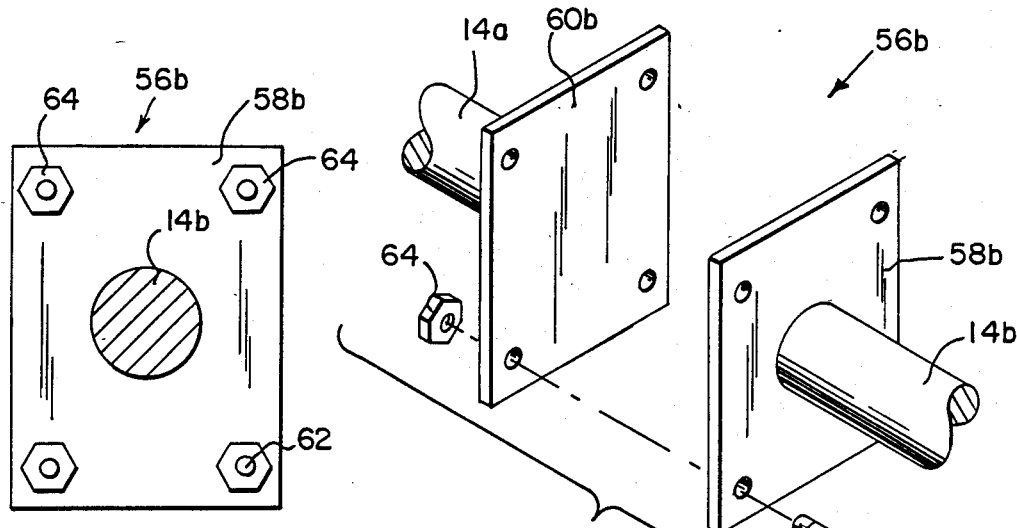
Figure 6    Figure 7

LIQUID CHEMICAL APPLICATOR FOR TREATMENT OF A HORIZONTAL SURFACE

BACKGROUND OF THE INVENTION

1. Field of the Invention

The instant invention relates generally to spray pump units and more specifically it relates to an improved liquid chemical applicator for treatment of a horizontal surface.

2. Description of the Prior Art

Numerous spray pump units have been provided in prior art that are adapted to apply low viscosity liquid material such as penetrating concrete sealent and curing compounds to concrete surfaces. While these units may be suitable for the particular purpose to which they address, they would not be as suitable for the purposes of the present invention as heretofore described.

SUMMARY OF THE INVENTION

A primary object of the present invention is to provide an improved liquid chemical applicator for treatment of a horizontal surface that will overcome the shortcomings of the prior art devices.

Another object is to provide an improved liquid chemical applicator for treatment of a horizontal surface in which one person can perform the coating functions of eight conventional pump units that are operated by eight different people.

An additional object is to provide an improved liquid chemical applicator for treatment of a horizontal surface that will minimize material waste by overlapping the low viscosity liquid material once every eight feet as opposed to once every stroke.

A further object is to provide an improved liquid chemical applicator for treatment of a horizontal surface that can accomplish a uniform coating of the material by keeping spray nozzles at a constant height and proper angle from the surface being treated.

A still further object is to provide an improved liquid chemical applicator for treatment of a horizontal surface that is simple and easy to use and is economical in cost to manufacture.

Another still further object is to provide an improved liquid chemical applicator for treatment of a horizontal surface that allows mobility, maneuverability and application of the chemical in concise and geometric patterns, quickly, efficiently and cost effectively.

A still additional object is to provide an improved liquid chemical applicator for treatment of a horizontal surface that is portable for the axle and extension handle can be disassembled and assembled when needed.

A still furthermore object is to provide an improved liquid chemical applicator for treatment of a horizontal surface whereby the length of the axle can be varied by adding and subtracting different segments thereto.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the invention.

FIG. 2 is an enlarged top plan view as indicated by arrow 2 in FIG. 1 showing the face of the control valve and its corresponding gauge.

FIG. 3 is a cross sectional view taken along line 3—3 in FIG. 1.

FIG. 4 is a chart indicating the various settings of the invention in use.

FIG. 5 is a top plan view of the invention showing the extension arm and axle with connectors therein.

FIG. 6 is a cross sectional view taken along line 6—6 in FIG. 5.

FIG. 7 is an exploded perspective view of one of the connectors on the axle.

DETAILED DESCRIPTION OF THE PREFERRED EMBODIMENTS

Turning now descriptively to the drawings, in which similar reference characters denote similar elements throughout the several views, FIGS. 1 through 3 illustrates a liquid chemical applicator 10 for treatment of a horizontal surface 52. The applicator 10 consists of a pair of front wheels 18, a frame 12, a rear wheel 54 and a mechanism 29 for applying a uniform coating of the liquid chemical 50 onto the horizontal surface 52 from the applicator 10 which is controlled by an operator (not shown).

The frame 12 has an axle 14, an extension arm 16 and a control handle 22. The axle 14 extends between the front wheels 18. The extension arm 16 rearwardly projects transversely from center of the axle 14 and bends upwardly therefrom with the control handle 22 at distal end 15 of the extension arm 16. The rear wheel 54 is rotatably connected to bottom of the extension arm 16 rearwardly of the front wheels 18 whereby the rear wheel 54 is manually steered by the operator holding onto the control handle 22.

The mechanism 29 consists of a drum 24 for holding the liquid chemical 50 therein. A pump 26 is fluidly connected to the drum 24 for removing the liquid chemical from the drum and bringing the liquid chemical to the applicator 10 at a desired pressure. A device 33 is for directing flow of the liquid chemical 50 through the applicator. A pair of manifolds 44 and 46 are mounted along the axle 14. Each of the manifolds 44 and 46 have a plurality of spray nozzles 48. Another device 35 for controlling pressure of the liquid chemical 50 is fluidly connected between the device 33 and the spray nozzles 48 of the manifolds 44 and 46 so that the spray nozzles will apply a plurality of overlapping sprays of the liquid chemical at a constant height, a constant pressure and a proper angle onto the horizontal surface 52.

A storage basket 20 is mounted to top of the extension arm 16 between the front wheels 18 and the rear wheel 54. A wind shield 56 is mounted onto the axle 14 over the manifolds 4 and 46 to help keep spray pattern constant and prevent the liquid chemical 50 from blowing away.

The device 33 consists of a control valve 30 that has a plurality of spray combination position markings 37 thereon. A control lever 31 is pivotly mounted to the control valve 30 and has a deactivated horizontal position and an activated vertical position. When the spray combination position is to be changed the control lever 31 must be put in the deactivated horizontal position and returned to the activated vertical position after spray selection is made. A control valve pressure gauge 36 is provided for monitoring pressure of the liquid chemical from the pump 26.

The device 35 consists of three supply hoses 32 extending from the control valve 31 and are mounted to the extension arm 16. A regulator 34 is mounted on the storage basket 20 and has one inlet port and one outlet port. The inlet port is fluidly connected to one of the supply hoses 32. The outlet port through elongated hose 40 is fluidly connected to a spray wand 42 whereby the regulator 34 can control pressure of the liquid chemical 50 to the spray wand 42 in which the spray wand can be held by the operator to be manually used for spray touch ups and the like. A regulator pressure gauge 38 is for monitoring pressure of the liquid chemical through the regulator 34. The elongated hose 40 and the spray wand 42 can be stored in the storage basket 20 when not being used. The two remaining supply hoses 32 which extend from the control valve 31 are mounted through the storage basket 20 and are fluidly connected to each of the manifolds 44 and 46 whereby pressure is monitored at the pump 26.

An improved liquid chemical applicator 10a is shown in FIG. 5 and is identical to the applicator 10 except that it includes a first connector 56a integral with the extension arm 16a so that the extension arm can be disassembled and assembled when needed. A pair of second connectors 56b are also provided, each being integral with the axle 14a on either side of the extension arm 16a so that the axle 14a can be disassembled and assembled when needed. The length of the axle 14a can be varied by adding and subtracting different axle segment lengths 14b to the axle 14a thereto. This can change the overall size of the applicator 10a between wheels 18a from typically four feet to sixteen feet in size.

The connector 56a includes a pair of mounting plates 58a and 60a, each of which has four holes, each extending through one corner thereof. Each of the mounting plates 58a and 60a are centrally mounted to one portion of the extension arm 16a. Four fasteners, such as bolts 62 and nuts 64, each extend through matching holes in the mounting plates 58a and 60a for securing the mounting plates together.

Each of the connectors 56b, as best seen in FIGS. 6 and 7, includes a pair of mounting plates 58b and 60b, each of which has four holes, each extending through one corner thereof. One of the mounting plates 60b is centrally mounted to the axle 14a while other of the mounting plates 58b is centrally mounted to the axle segment length 14b. Four fasteners, such as bolts 62 and nuts 64, each extend through matching holes in the mounting plates 58b and 60b for securing the mounting plates together.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved liquid chemical applicator for treatment of a horizontal surface which comprises:
   (a) a pair of front wheels;
   (b) a frame having an axle, an extension arm and a control handle, said axle extending between said front wheels, said extension arm rearwardly projecting transversely from center of said axle bending upwardly therefrom with said control handle at distal end of said extension arm;
   (c) a first connector integral with said extension arm so that said extension arm can be disassembled and assembled when needed for storage;
   (d) a pair of second connectors, each integral with said axle on either side of said extension arm so that said axle can be disassembled and assembled when needed for storage and for providing for different widths and the length of said axle can be varied by adding and subtracting different axle segment lengths to said axle;
   (e) a rear wheel pivotally connected to bottom of said extension arm rearwardly of said front wheels so that mobility is increased and said rear wheel is manually steered by an operator holding onto said control handle;
   (f) means for applying a uniform coating of said liquid chemical onto said horizontal surface from said applicator which is controlled by said operator, said applying means including a drum for holding said liquid chemical therein and a pump fluidly connected to said drum for removing said liquid chemical from said drum and bringing said liquid chemical to said applicator at a desired pressure and means for directing flow of said liquid chemical through said applicator and a pair of manifolds mounted along said axle each of said manifolds having a plurality of spray nozzles and means for controlling pressure of said liquid chemical fluidly connected between said directing means and said spray nozzles of said manifolds so that said spray nozzles will apply a plurality of overlapping sprays of said liquid chemical at a constant height a constant pressure and a proper angle onto said horizontal surface;
   (g) a storage basket mounted to top of said extension arm between said front wheels and said rear wheel; and
   (h) a wind shield mounted onto said axle over said manifolds to help keep spray pattern constant and prevent said liquid chemical from blowing away.

2. An improved liquid chemical applicator as recited in claim 1, wherein said flow directing means comprises:
   (a) a control valve having a plurality of spray combination position markings hereon;
   (b) a control lever pivotly mounted to said control valve having a deactivated horizontal position and an activated vertical position so that when said spray combination position is to be changed said control lever must be put in said deactivated horizontal position and returned to activated vertical position after spray selection is made; and (c) a control valve pressure gauge for monitoring pressure of said liquid chemical from said pump.

3. An improved liquid chemical applicator as recited in claim 1, wherein said pressure controlling means comprises:

(a) three supply hoses extending from said control valve and mounted to said extension arm;

(b) a regulator mounted on said storage basket, said regulator having one inlet port and one outlet port, said inlet port fluidly connected to one of said supply hoses while each of two remaining said outlet ports are fluidly connected to each of said manifolds so that said pump can control pressure of said liquid chemical to said spray nozzles; and (c) a regulator pressure gauge for monitoring pressure of said liquid chemical through said regulator.

4. An improved liquid chemical applicator as recited in claim 3, further comprising:

(a) an elongated hose fluidly connected to one of said outlet ports of said regulator; and (b) a spray wand connected to said elongated hose so that said regulator can control pressure of said liquid chemical to said spray wand in which said spray wand can be held by said operator to be manually used for spray touch ups and the like, said elongated hose and said spray wand can be stored in said storage basket when not being used.

5. An improved liquid chemical applicator as recited in claim 4, wherein said first connector includes:

(a) a pair of mounting plates, each of said mounting plates having four holes, each extending through one corner thereof, each of said mounting plates centrally mounted to one portion of said extension arm; and (b) four fasteners, each extending through matching holes in said mounting plates for securing said mounting plates together.

6. An improved liquid chemical applicator as recited in claim 5, wherein each of said second connectors includes:

(a) a pair of mounting plates, each of said mounting plates having four holes, each extending through one corner thereof, one of said mounting plates centrally mounted to said axle while other of said mounting plates centrally mounted to said axle segment length: and (b) four fasteners, each extending through matching holes in said mounting plates for securing said mounting plates together.

* * * * *